(12) United States Patent
Lin et al.

(10) Patent No.: US 7,120,197 B2
(45) Date of Patent: Oct. 10, 2006

(54) MOTION COMPENSATION LOOP WITH FILTERING

(75) Inventors: Chih-Lung Lin, Redmond, WA (US); Pohsiang Hsu, Redmond, WA (US); Thomas W. Holcomb, Bothell, WA (US); Ming-Chieh Lee, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 777 days.

(21) Appl. No.: 10/322,383

(22) Filed: Dec. 17, 2002

(65) Prior Publication Data

US 2003/0152146 A1   Aug. 14, 2003

Related U.S. Application Data

(60) Provisional application No. 60/341,674, filed on Dec. 17, 2001.

(51) Int. Cl.
*H04N 7/12* (2006.01)

(52) U.S. Cl. .................. 375/240.29; 382/266

(58) Field of Classification Search ........... 375/240.12, 375/240.02, 240.29, 240.16, 240.24; 382/266, 382/275
See application file for complete search history.

(56) References Cited

U.S. PATENT DOCUMENTS

| | | | |
|---|---|---|---|
| 5,089,889 A | 2/1992 | Sugiyama | |
| 5,787,203 A | 7/1998 | Lee et al. | 382/232 |
| 5,799,113 A | 8/1998 | Lee | 382/256 |
| 5,844,613 A | 12/1998 | Chaddha | 348/416 |
| 5,970,173 A | 10/1999 | Lee et al. | 382/236 |
| 6,038,256 A | 3/2000 | Wells et al. | |
| 6,160,503 A | 12/2000 | Andrews et al. | |
| 6,178,205 B1* | 1/2001 | Cheung et al. | 375/240.29 |
| 6,233,017 B1 | 5/2001 | Chaddha | 348/412 |
| 6,236,764 B1 | 5/2001 | Zhou et al. | |
| 6,249,610 B1 | 6/2001 | Matsumoto et al. | |
| 6,281,942 B1 | 8/2001 | Wang | 348/607 |
| 6,337,881 B1 | 1/2002 | Chaddha | 375/240.16 |
| 6,380,985 B1 | 4/2002 | Callahan | |
| 6,466,624 B1 | 10/2002 | Fogg | |
| 6,473,409 B1 | 10/2002 | Malvar | |
| 6,665,346 B1* | 12/2003 | Lee et al. | 375/240.29 |
| 6,690,838 B1* | 2/2004 | Zhou | 382/266 |
| 6,704,718 B1 | 3/2004 | Burges et al. | |
| 6,766,063 B1 | 7/2004 | Gonsalves | |
| 6,983,079 B1* | 1/2006 | Kim | 382/275 |
| 2002/0009146 A1 | 1/2002 | Westermann et al. | |
| 2002/0150166 A1 | 10/2002 | Johnson | |

FOREIGN PATENT DOCUMENTS

EP     966841    12/1999

(Continued)

OTHER PUBLICATIONS

ITU-T Recommendation H.263, "Series H: Audiovisual and Multimedia Systems, Infrastructure of Audiovisual Services—Coding of Moving Video," International Telecommunication Union, pp. iii-x, 4, 15-16, 23-26, 80-84, 141-142 (Feb. 1998).

(Continued)

*Primary Examiner*—Gims Philippe
(74) *Attorney, Agent, or Firm*—Klarquist Sparkman, LLP

(57) ABSTRACT

Techniques and tools for processing reference frames in a motion estimation/compensation loop or motion compensation loop are described. For example, a video encoder or decoder filters reference frames to reduce discontinuities at block boundaries, improving the efficiency of motion estimation and compensation.

25 Claims, 12 Drawing Sheets

FOREIGN PATENT DOCUMENTS

| | | |
|---|---|---|
| GB | 2365647 | 2/2002 |
| TW | 379509 | 1/2000 |
| WO | WO 03/036979 | 5/2003 |

OTHER PUBLICATIONS

Lee et al., U.S. Appl. No. 09/849,502, entitled "Dynamic Filtering For Lossy Compression," filed May 3, 2001.

Kotropoulos et al., "Adaptive LMS *L* filters for Noise Suppression in Images," *IEEE Transactions on Image Processing*, vol. 5, No. 12, pp. 1596-1609 (1996). [48 pp. as downloaded from the World Wide Web on Apr. 30, 2001].

ITU-T, "ITU-T Recommendation H.261: Video Codec for Audio-visual Services at *p*×64 kbits," 28 pp. (1993).

ITU-T, "ITU-T Recommendation H.262: Information Technology-13 Generic Coding of Moving Pictures and Associated Audio Information: Video," 218 pp. (1995).

ITU-T, "ITU-T Recommendation H.263: Video Coding for Low Bit Rate Communication," 167 pp. (1998).

ISO/IEC, "ISO/IEC 11172-2: Information Technology—Coding of Moving Pictures and Associated Audio for Storage Media at up to About 1,5 Mbit/s," 122 pp. (1993).

ISO/IEC, "Information Technology—Coding of Audio-Visual Objects: Visual, ISO/IEC 14496-2, Committee Draft," 330 pp. (1998).

Joint Video Team of ISO/IEC MPEG and ITU-T VCEG, "Final Joint Committee Draft of Joint Video Specification (ITU-T Recommendation H.264, ISO/IEC 14496-10 AVC," 206 pp. (Aug. 2002).

Reader, "History of MPEG Video Compression—Ver. 4.0," 99 pp., document marked Dec. 16, 2003.

Printouts of FTP directories from http://ftp3.itu.ch, 8 pp. (downloaded from the World Wide Web on Sep. 20, 2005).

Linares et al., "JPEG Estimated Spectrum Adaptive Postfiltering Using Image-Adaptive Q-Tables and Canny Edge Detectors," *Proc. ISCAS'96*, Atlanta GA, May 1996.

Lee et al., "Blocking Effect Reduction of JPEG Images by Signal Adaptive Filtering," *IEEE Trans. on Image Processing*, vol. 7, pp. 229-234, Feb. 1998.

Meier et al., "Reduction of Blocking Artifacts in Image and Video Coding," *IEEE Trans. on Circuits and Systems for Video Technology*, vol. 9, No. 3, pp. 490-500, Apr. 1999.

Joch et al., "A Performance Analysis of the ITU-T Draft H.26L Video Coding Standard." http://pv2002.ece.cmu.edu/papers (Current August 2002).

Chen et al., "Adaptive post-filtering of transform coefficients for the reduction of blocking artifacts," *IEEE Transactions on Circuits and Systems for Video Technology*, vol. 11, No. 5, pp. 594-602, 2001.

Choy et al., "Reduction of coding artifacts in transform image coding by using local statistics of transform coefficients," *IEEE International Symposium on Circuits and Systems*, pp. 1089-1092, 1997.

Minami et al., "An optimization approach for removing blocking effects in transform coding," *IEEE Transactions on Circuits and Systems for Video Technology*, vol. 5, No. 2, pp. 74-82, 1995.

Zhang et al., "A new approach to reduce the "blocking effect" of transform coding," *IEEE Transactions on Communications*, vol. 41, No. 2, pp. 299-302, 1993.

Malvar, "Biorthogonal and Nonuniform Lapped Transforms for Transform Coding with Reduced Blocking and Ringing Artifacts," *IEEE Transactions on Signal Processing* 46(4):1043-1053, Apr. 1998.

Malvar, "A pre- and post-filtering technique for the reduction of blocking effects," in *Proc. Picture Coding Symp.*, Stockholm, Sweden, Jun. 1987.

Panis et al., "A method for reducing block artifacts by interpolating block borders," available at http://www.cs.mcgill.ca/~gstamm/Siemens1/paper1.html.

Panis et al., "Reduction of block artifacts by selective removal and reconstruction of the block borders," Picture Coding Symposium 97, Berlin, Sep. 10-12, 1997.

Wu et al., "Joint estimation of forward and backward motion vectors for interpolative prediction of video," *IEEE Transactions on Image Processing*, vol. 3, No. 5, pp. 684-687, Sep. 1994.

Lee et al., "Loop filtering and post—filtering for low-bit-rates moving picture coding," *Signal Processing: Image Communication 16*, pp. 871-890 (2001).

Sun et al., "Loop Filter with Skip Mode," Study Group 16, Video Coding Experts Group, 8 pp. (2001).

O'Rourke et al., "Improved Image Decompression for Reduced Transform Coding Artifacts," *IEEE Trans. on Circuits and Systems for Video Technology*, vol. 5, No. 6, (Dec. 1995).

Wien, "Variable Block-Size Transforms for Hybrid Video Coding," Dissertation, 182 pp. (Feb. 2004).

Sullivan et al., "The H.264/AVC Advanced Video Coding Standard: Overview and Introduction to the Fidelity Range Extensions," 21 pp. (Aug. 2004).

Wiegand, "Joint Model No. 1, Revision 1 (JM1-r1)," JVT-A003r1, 80 pp. (document marked "Generated: Jan. 18, 2002").

\* cited by examiner

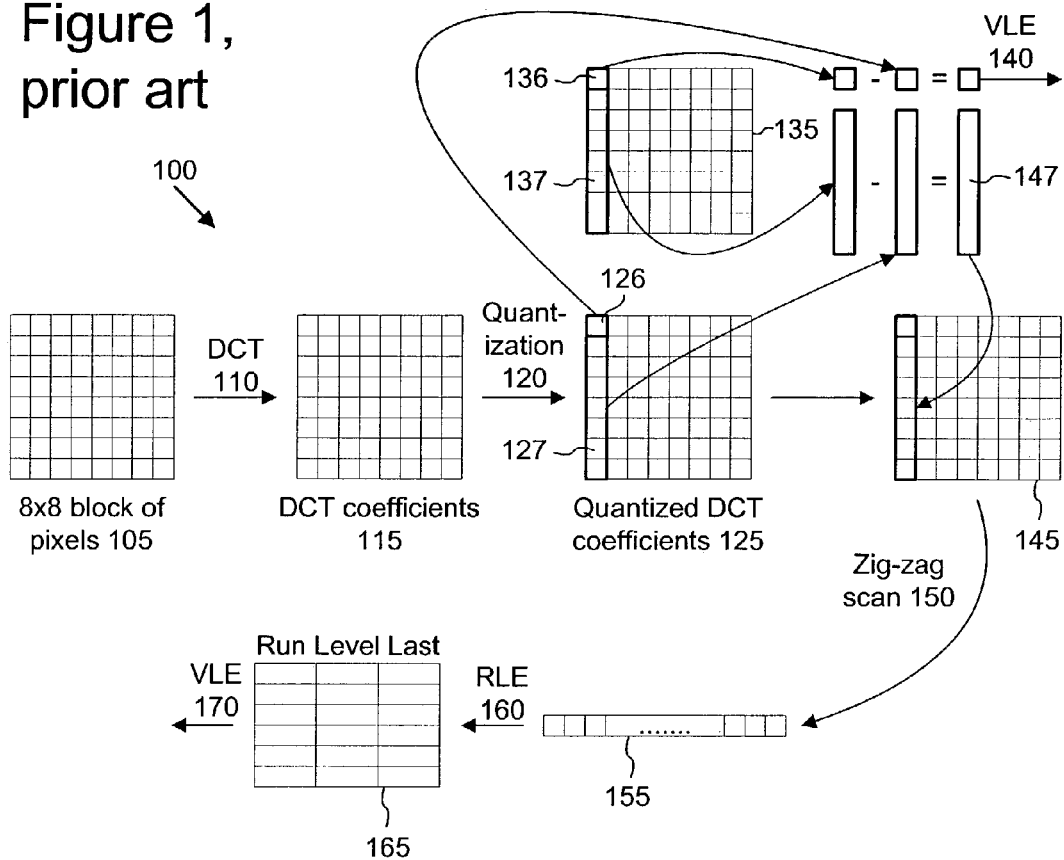
Figure 1, prior art
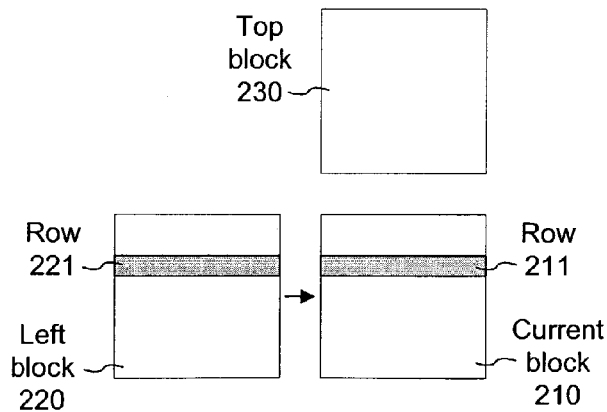
Figure 2, prior art

Figure 3, prior art
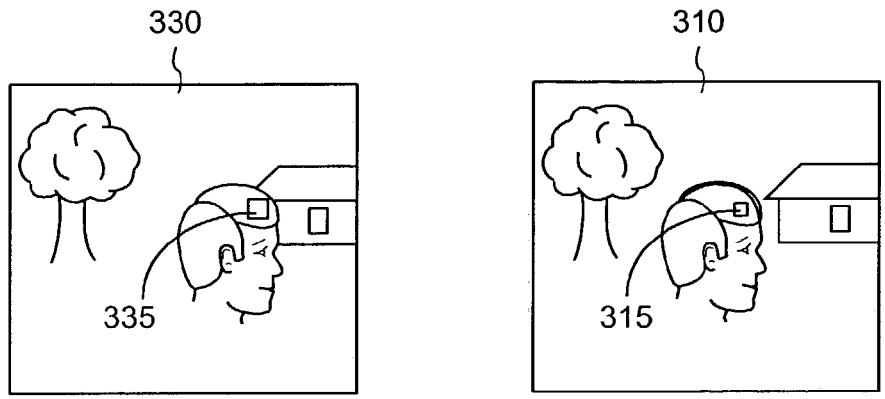
Figure 6
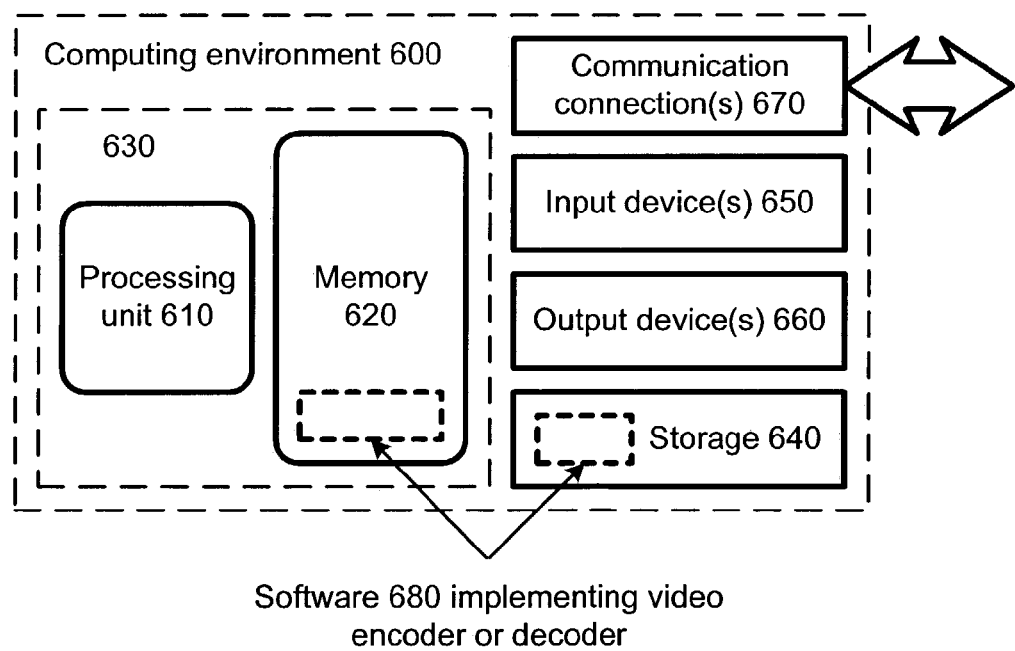
Software 680 implementing video
encoder or decoder

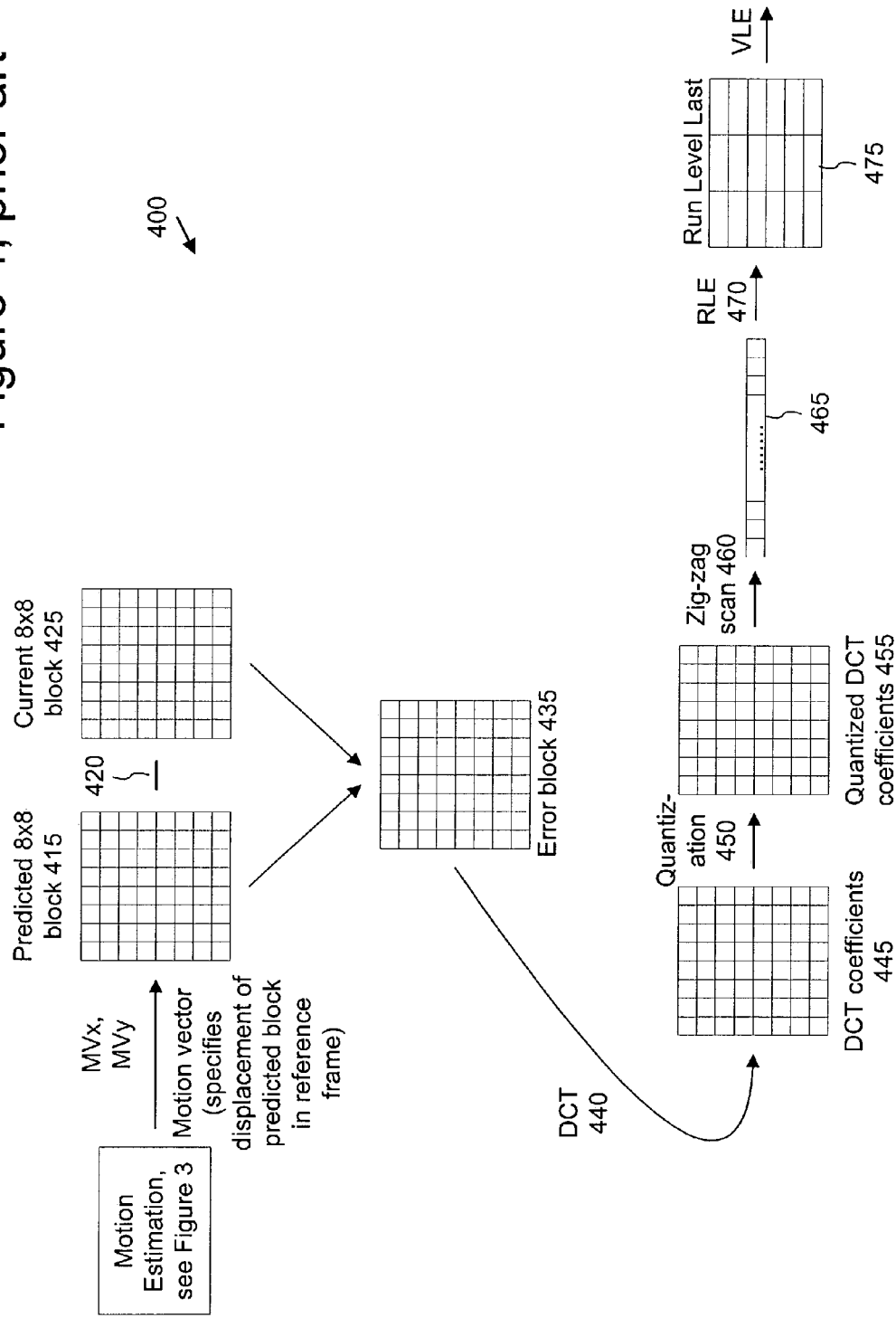
Figure 4, prior art

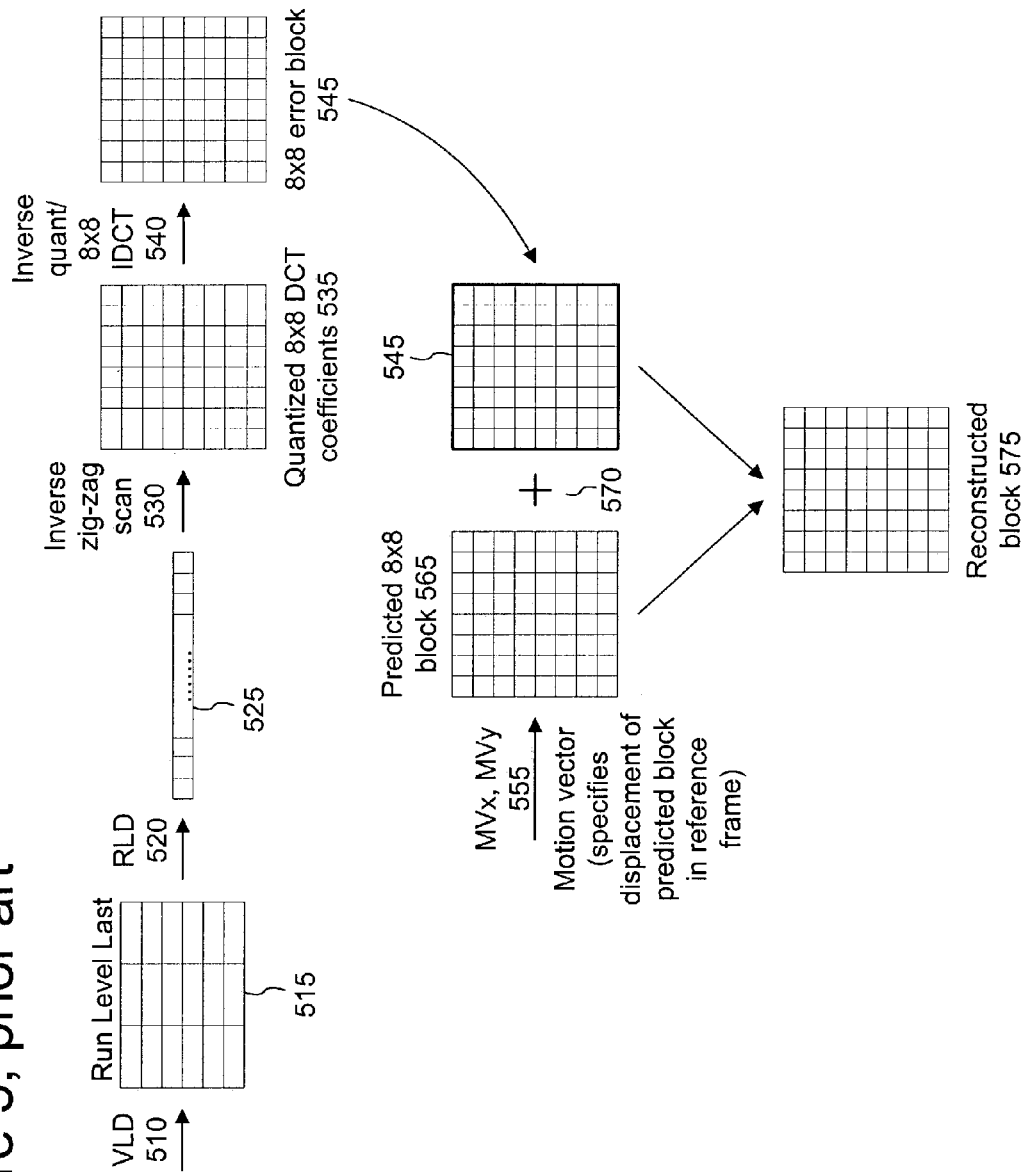
Figure 5, prior art

1400

8th, 16th, 24th, etc. vertical line

1500

8th, 16th, 24th, etc. horizontal line

Figure 16

```
a0 = (2*(P3 - P6) - 5*(P4 – P5) + 4) >> 3                        1600
if (|a0| < PQUANT) {
    a1 = (2*(P1 - P4) - 5*(P2 - P3) + 4) >> 3
    a2 = (2*(P5 - P8) - 5*(P6 - P7) + 4) >> 3
     a3 = min(|a1|, |a2|)
    if (a3 < |a0|)
    {
        clip = (P4 – P5)/2
        if (clip > 0)
        {
            if (a0 < 0){
                d = 5*(|a0| -a3) >> 3
                if (d > clip)
                    d = clip
                P4 = P4 - d
                P5 = P5 + d
            }
        }
        else if (clip < 0)
        {
            if (a0 >= 0){
                d = (5*(a3 - |a0|) + 7) >>3
                if (d < clip)
                    d = clip
                P4 = P4 - d
                P5 = P5 + d
            }
        }
    }
}
```

MOTION COMPENSATION LOOP WITH FILTERING

RELATED APPLICATION INFORMATION

The present application claims the benefit of U.S. Provisional Patent Application Ser. No. 60/341,674, entitled "Techniques and Tools for Video Encoding and Decoding," filed Dec. 17, 2001, the disclosure of which is incorporated by reference. The following concurrently filed U.S. patent applications relate to the present application: 1) U.S. patent application Ser. No. 10/322,171, entitled, "Spatial Extrapolation of Pixel Values in Intraframe Video Coding and Decoding," filed concurrently herewith; 2) U.S. patent application Ser. No. 10/322,351, entitled, "Multi-Resolution Motion Estimation and Compensation," filed concurrently herewith; and 3) U.S. patent application Ser. No. 10/322,352, entitled, "Sub-Block Transform Coding of Prediction Residuals," filed concurrently herewith.

TECHNICAL FIELD

Techniques and tools for processing reference frames in a motion estimation/compensation loop or motion compensation loop are described. For example, a video encoder or decoder filters reference frames to reduce discontinuities at block boundaries, improving the efficiency of motion estimation and compensation.

BACKGROUND

Digital video consumes large amounts of storage and transmission capacity. A typical raw digital video sequence includes 15 or 30 frames per second. Each frame can include tens or hundreds of thousands of pixels (also called pels). Each pixel represents a tiny element of the picture. In raw form, a computer commonly represents a pixel with 24 bits. Thus, the number of bits per second, or bitrate, of a typical raw digital video sequence can be 5 million bits/second or more.

Most computers and computer networks lack the resources to process raw digital video. For this reason, engineers use compression (also called coding or encoding) to reduce the bitrate of digital video. Compression can be lossless, in which quality of the video does not suffer but decreases in bitrate are limited by the complexity of the video. Or, compression can be lossy, in which quality of the video suffers but decreases in bitrate are more dramatic. Decompression reverses compression.

In general, video compression techniques include intraframe compression and interframe compression. Intraframe compression techniques compress individual frames, typically called I-frames, or key frames. Interframe compression techniques compress frames with reference to preceding and/or following frames, and are called typically called predicted frames, P-frames, or B-frames.

Microsoft Corporation's Windows Media Video, Version 7 ["WMV7"] includes a video encoder and a video decoder. The WMV7 encoder uses intraframe and interframe compression, and the WMV7 decoder uses intraframe and interframe decompression.

A. Intraframe Compression in WMV7

FIG. 1 illustrates block-based intraframe compression (100) of a block (105) of pixels in a key frame in the WMV7 encoder. A block is a set of pixels, for example, an 8×8 arrangement of pixels. The WMV7 encoder splits a key video frame into 8×8 blocks of pixels and applies an 8×8 Discrete Cosine Transform ["DCT"] (110) to individual blocks such as the block (105). A DCT is a type of frequency transform that converts the 8×8 block of pixels (spatial information) into an 8×8 block of DCT coefficients (115), which are frequency information. The DCT operation itself is lossless or nearly lossless. Compared to the original pixel values, however, the DCT coefficients are more efficient for the encoder to compress since most of the significant information is concentrated in low frequency coefficients (conventionally, the upper left of the block (115)) and many of the high frequency coefficients (conventionally, the lower right of the block (115)) have values of zero or close to zero.

The encoder then quantizes (120) the DCT coefficients, resulting in an 8×8 block of quantized DCT coefficients (125). For example, the encoder applies a uniform, scalar quantization step size to each coefficient, which is analogous to dividing each coefficient by the same value and rounding. For example, if a DCT coefficient value is 163 and the step size is 10, the quantized DCT coefficient value is 16. Quantization is lossy. The reconstructed DCT coefficient value will be 160, not 163. Since low frequency DCT coefficients tend to have higher values, quantization results in loss of precision but not complete loss of the information for the coefficients. On the other hand, since high frequency DCT coefficients tend to have values of zero or close to zero, quantization of the high frequency coefficients typically results in contiguous regions of zero values. In addition, in some cases high frequency DCT coefficients are quantized more coarsely than low frequency DCT coefficients, resulting in greater loss of precision/information for the high frequency DCT coefficients.

The encoder then prepares the 8×8 block of quantized DCT coefficients (125) for entropy encoding, which is a form of lossless compression. The exact type of entropy encoding can vary depending on whether a coefficient is a DC coefficient (lowest frequency), an AC coefficient (other frequencies) in the top row or left column, or another AC coefficient.

The encoder encodes the DC coefficient (126) as a differential from the DC coefficient (136) of a neighboring 8×8 block, which is a previously encoded neighbor (e.g., top or left) of the block being encoded. (FIG. 1 shows a neighbor block (135) that is situated to the left of the block being encoded in the frame.) The encoder entropy encodes (140) the differential.

The entropy encoder can encode the left column or top row of AC coefficients as a differential from a corresponding column or row of the neighboring 8×8 block. FIG. 1 shows the left column (127) of AC coefficients encoded as a differential (147) from the left column (137) of the neighboring (to the left) block (135). The differential coding increases the chance that the differential coefficients have zero values. The remaining AC coefficients are from the block (125) of quantized DCT coefficients.

The encoder scans (150) the 8×8 block (145) of predicted, quantized AC DCT coefficients into a one-dimensional array (155) and then entropy encodes the scanned AC coefficients using a variation of run length coding (160). The encoder selects an entropy code from one or more run/level/last tables (165) and outputs the entropy code.

A key frame contributes much more to bitrate than a predicted frame. In low or mid-bitrate applications, key frames are often critical bottlenecks for performance, so efficient compression of key frames is critical.

FIG. 2 illustrates a disadvantage of intraframe compression such as shown in FIG. 1. In particular, exploitation of redundancy between blocks of the key frame is limited to prediction of a subset of frequency coefficients (e.g., the DC coefficient and the left column (or top row) of AC coefficients) from the left (220) or top (230) neighboring block of a block (210). The DC coefficient represents the average of the block, the left column of AC coefficients represents the averages of the rows of a block, and the top row represents the averages of the columns. In effect, prediction of DC and AC coefficients as in WMV7 limits extrapolation to the row-wise (or column-wise) average signals of the left (or top) neighboring block. For a particular row (221) in the left block (220), the AC coefficients in the left DCT coefficient column for the left block (220) are used to predict the entire corresponding row (211) of the block (210). The disadvantages of this prediction include:

1) Since the prediction is based on averages, the far edge of the neighboring block has the same influence on the predictor as the adjacent edge of the neighboring block, whereas intuitively the far edge should have a smaller influence.
2) Only the average pixel value across the row (or column) is extrapolated.
3) Diagonally oriented edges or lines that propagate from either predicting block (top or left) to the current block are not predicted adequately.
4) When the predicting block is to the left, there is no enforcement of continuity between the last row of the top block and the first row of the extrapolated block.

B. Interframe Compression in WMV7

Interframe compression in the WMV7 encoder uses block-based motion compensated prediction coding followed by transform coding of the residual error. FIGS. 3 and 4 illustrate the block-based interframe compression for a predicted frame in the WMV7 encoder. In particular, FIG. 3 illustrates motion estimation for a predicted frame (310) and FIG. 4 illustrates compression of a prediction residual for a motion-estimated block of a predicted frame.

The WMV7 encoder splits a predicted frame into 8×8 blocks of pixels. Groups of 4 8×8 blocks form macroblocks. For each macroblock, a motion estimation process is performed. The motion estimation approximates the motion of the macroblock of pixels relative to a reference frame, for example, a previously coded, preceding frame. In FIG. 3, the WMV7 encoder computes a motion vector for a macroblock (315) in the predicted frame (310). To compute the motion vector, the encoder searches in a search area (335) of a reference frame (330). Within the search area (335), the encoder compares the macroblock (315) from the predicted frame (310) to various candidate macroblocks in order to find a candidate macroblock that is a good match. The encoder can check candidate macroblocks every pixel or every ½ pixel in the search area (335), depending on the desired motion estimation resolution for the encoder. Other video encoders check at other increments, for example, every ¼ pixel. For a candidate macroblock, the encoder checks the difference between the macroblock (315) of the predicted frame (310) and the candidate macroblock and the cost of encoding the motion vector for that macroblock. After the encoder finds a good matching macroblock, the block matching process ends. The encoder outputs the motion vector (entropy coded) for the matching macroblock so the decoder can find the matching macroblock during decoding. When decoding the predicted frame (310), a decoder uses the motion vector to compute a prediction macroblock for the macroblock (315) using information from the reference frame (330). The prediction for the macroblock (315) is rarely perfect, so the encoder usually encodes 8×8 blocks of pixel differences (also called the error or residual blocks) between the prediction macroblock and the macroblock (315) itself.

Motion estimation and compensation are effective compression techniques, but various previous motion estimation/compensation techniques (as in WMV7 and elsewhere) have several disadvantages, including:

1) The resolution of the motion estimation (i.e., pixel, ½ pixel, ¼ pixel increments) does not adapt to the video source. For example, for different qualities of video source (clean vs. noisy), the video encoder uses the same resolution of motion estimation, which can hurt compression efficiency.
2) For ¼ pixel motion estimation, the search strategy fails to adequately exploit previously completed computations to speed up searching.
3) For ¼ pixel motion estimation, the search range is too large and inefficient. In particular, the horizontal resolution is the same as the vertical resolution in the search range, which does not match the motion characteristics of many video signals.
4) For ¼ pixel motion estimation, the representation of motion vectors is inefficient to the extent bit allocation for horizontal movement is the same as bit allocation for vertical resolution.

FIG. 4 illustrates the computation and encoding of an error block (435) for a motion-estimated block in the WMV7 encoder. The error block (435) is the difference between the predicted block (415) and the original current block (425). The encoder applies a DCT (440) to error block (435), resulting in 8×8 block (445) of coefficients. Even more than was the case with DCT coefficients for pixel values, the significant information for the error block (435) is concentrated in low frequency coefficients (conventionally, the upper left of the block (445)) and many of the high frequency coefficients have values of zero or close to zero (conventionally, the lower right of the block (445)).

The encoder then quantizes (450) the DCT coefficients, resulting in an 8×8 block of quantized DCT coefficients (455). The quantization step size is adjustable. Again, since low frequency DCT coefficients tend to have higher values, quantization results in loss of precision, but not complete loss of the information for the coefficients. On the other hand, since high frequency DCT coefficients tend to have values of zero or close to zero, quantization of the high frequency coefficients results in contiguous regions of zero values. In addition, in some cases high frequency DCT coefficients are quantized more coarsely than low frequency DCT coefficients, resulting in greater loss of precision/information for the high frequency DCT coefficients.

The encoder then prepares the 8×8 block (455) of quantized DCT coefficients for entropy encoding. The encoder scans (460) the 8×8 block (455) into a one dimensional array (465) with 64 elements, such that coefficients are generally ordered from lowest frequency to highest frequency, which typical creates long runs of zero values.

The encoder entropy encodes the scanned coefficients using a variation of run length coding (470). The encoder selects an entropy code from one or more run/level/last tables (475) and outputs the entropy code.

FIG. 5 shows the decoding process (500) for an inter-coded block. Due to the quantization of the DCT coefficients, the reconstructed block (575) is not identical to the corresponding original block. The compression is lossy.

In summary of FIG. 5, a decoder decodes (510, 520) entropy-coded information representing a prediction residual using variable length decoding and one or more run/level/last tables (515). The decoder inverse scans (530) a one-dimensional array (525) storing the entropy-decoded information into a two-dimensional block (535). The decoder inverse quantizes and inverse discrete cosine transforms (together, 540) the data, resulting in a reconstructed error block (545). In a separate path, the decoder computes a predicted block (565) using motion vector information (555) for displacement from a reference frame. The decoder combines (570) the predicted block (555) with the reconstructed error block (545) to form the reconstructed block (575).

The amount of change between the original and reconstructed frame is termed the distortion and the number of bits required to code the frame is termed the rate. The amount of distortion is roughly inversely proportional to the rate. In other words, coding a frame with fewer bits (greater compression) will result in greater distortion and vice versa. One of the goals of a video compression scheme is to try to improve the rate-distortion—in other words to try to achieve the same distortion using fewer bits (or the same bits and lower distortion).

Compression of prediction residuals as in WMV7 can dramatically reduce bitrate while slightly or moderately affecting quality, but the compression technique is less than optimal in some circumstances. The size of the frequency transform is the size of the prediction residual block (e.g., an 8×8 DCT for an 8×8 prediction residual). In some circumstances, this fails to exploit localization of error within the prediction residual block.

C. Post-Processing with a Deblocking Filter in WMV7

For block-based video compression and decompression, quantization and other lossy processing stages introduce distortion that commonly shows up as blocky artifacts—perceptible discontinuities between blocks.

To reduce the perceptibility of blocky artifacts, the WMV7 decoder can process reconstructed frames with a deblocking filter. The deblocking filter smoothes the boundaries between blocks.

While the deblocking filter in WMV7 improves perceived video quality, it has several disadvantages. For example, the smoothing occurs only on reconstructed output in the decoder. Therefore, prediction processes such as motion estimation cannot take advantage of the smoothing. Moreover, the smoothing by the post-processing filter can be too extreme.

D. Standards for Video Compression and Decompression

Aside from WMV7, several international standards relate to video compression and decompression. These standards include the Motion Picture Experts Group ["MPEG"] 1, 2, and 4 standards and the H.261, H.262, and H.263 standards from the International Telecommunication Union ["ITU"]. Like WMV7, these standards use a combination of intraframe and interframe compression, although the standards typically differ from WMV7 in the details of the compression techniques used. For additional detail about the standards, see the standards' specifications themselves.

In particular, Annex J of the H.263 standard describes an optional block edge filter within a coding loop. The filtering is performed on 8×8 block edges. For additional detail, see Annex J of the H.263 standard as well as Annex Q.7.

The deblocking filter mode described in Annex J of the H.263 standard has several disadvantages. First, in many cases, the filtering results in the loss of too much original information in reference frames. For example, for a filtered vertical block edge, the filtering typically changes the pixel values of the two columns of pixels on each side of the vertical block edge. Second, the filtering fails to account for image discontinuities in the pixels on the respective sides of block edges.

Given the critical importance of video compression and decompression to digital video, it is not surprising that video compression and decompression are richly developed fields. Whatever the benefits of previous video compression and decompression techniques, however, they do not have the advantages of the following techniques and tools.

SUMMARY

In summary, the detailed description is directed to various techniques and tools for processing reference frames in a motion estimation/compensation loop of a video encoder and in a motion compensation loop of a video decoder. The various techniques and tools can be used in combination or independently.

According to a first set of techniques and tools, a video encoder applies a deblocking filter to reference frames in a motion estimation/compensation loop. A video decoder applies a deblocking filter to reference frames in a motion compensation loop. The deblocking filter smoothes block discontinuities, thereby improving the efficiency of motion estimation by improving prediction/reducing the bitrate of residuals.

According to a second set of techniques and tools, a video encoder adaptively filters block boundaries in a reference frame. For example, the video encoder filters only those block boundaries that exceed a filtering threshold, which reduces blurring of image properties coincident with block boundaries. A video decoder adaptively filters block boundaries in a reference frame.

According to a third set of techniques and tools, a video encoder uses a short filter to smooth block boundaries in a reference frame. Smoothing with the short filter changes fewer pixels, which helps avoid smoothing that could hurt motion estimation. A video decoder uses a short filter to smooth block boundaries in a reference frame.

According to a fourth set of techniques and tools, a video encoder adaptively enables or disables a deblocking filter in a motion estimation/motion compensation loop. The encoder determines whether to enable or disable the frame in a closed loop or an open loop. The encoder can enable/disable the deblocking filter on a sequence-by-sequence, frame-by-frame, or other basis. A video decoder adaptively enables or disables a deblocking filter in a motion compensation loop based upon received flags or contextual information.

Additional features and advantages will be made apparent from the following detailed description of different embodiments that proceeds with reference to the accompanying drawings.

BRIEF DESCRIPTION OF THE DRAWINGS

FIG. 1 is a diagram showing block-based intraframe compression of an 8×8 block of pixels according to prior art.

FIG. 2 is a diagram showing prediction of frequency coefficients according to the prior art.

FIG. 3 is a diagram showing motion estimation in a video encoder according to the prior art.

FIG. 4 is a diagram showing block-based interframe compression for an 8×8 block of prediction residuals in a video encoder according to the prior art.

FIG. 5 is a diagram showing block-based interframe decompression for an 8×8 block of prediction residuals according to the prior art.

FIG. 6 is a block diagram of a suitable computing environment in which several described embodiments may be implemented.

FIG. 16 is a code listing showing pseudocode for a filtering operation performed on pixels in horizontal or vertical lines.

DETAILED DESCRIPTION

Figure 7:
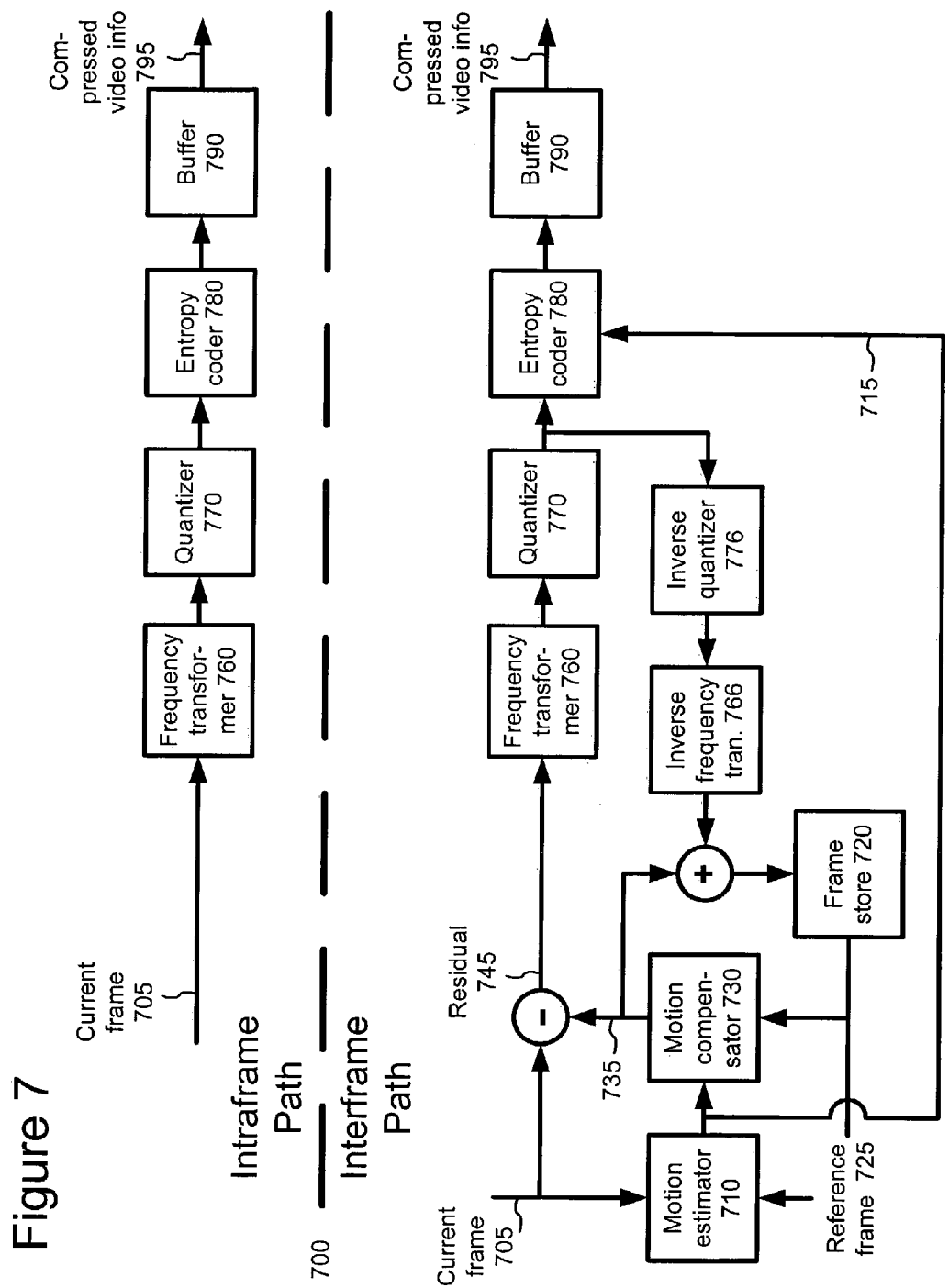
FIG. 7 is a block diagram of a generalized video encoder system used in several described embodiments.

The present application relates to techniques and tools for video encoding and decoding. In various described embodiments, a video encoder incorporates techniques that improve the efficiency of interframe coding, a video decoder incorporates techniques that improve the efficiency of interframe decoding, and a bitstream format includes flags and other codes to incorporate the techniques.

The various techniques and tools can be used in combination or independently. Different embodiments implement one or more of the described techniques and tools.

I. Computing Environment

FIG. 6 illustrates a generalized example of a suitable computing environment (600) in which several of the described embodiments may be implemented. The computing environment (600) is not intended to suggest any limitation as to scope of use or functionality, as the techniques and tools may be implemented in diverse general-purpose or special-purpose computing environments.

With reference to FIG. 6, the computing environment (600) includes at least one processing unit (610) and memory (620). In FIG. 6, this most basic configuration (630) is included within a dashed line. The processing unit (610) executes computer-executable instructions and may be a real or a virtual processor. In a multi-processing system, multiple processing units execute computer-executable instructions to increase processing power. The memory (620) may be volatile memory (e.g., registers, cache, RAM), non-volatile memory (e.g., ROM, EEPROM, flash memory, etc.), or some combination of the two. The memory (620) stores software (680) implementing a video encoder or decoder.

A computing environment may have additional features. For example, the computing environment (600) includes storage (640), one or more input devices (650), one or more output devices (660), and one or more communication connections (670). An interconnection mechanism (not shown) such as a bus, controller, or network interconnects the components of the computing environment (600). Typically, operating system software (not shown) provides an operating environment for other software executing in the computing environment (600), and coordinates activities of the components of the computing environment (600).

The storage (640) may be removable or non-removable, and includes magnetic disks, magnetic tapes or cassettes, CD-ROMs, DVDs, or any other medium which can be used to store information and which can be accessed within the computing environment (600). The storage (640) stores instructions for the software (680) implementing the video encoder or decoder.

The input device(s) (650) may be a touch input device such as a keyboard, mouse, pen, or trackball, a voice input device, a scanning device, or another device that provides input to the computing environment (600). For audio or video encoding, the input device(s) (650) may be a sound card, video card, TV tuner card, or similar device that accepts audio or video input in analog or digital form, or a CD-ROM or CD-RW that reads audio or video samples into the computing environment (600). The output device(s) (660) may be a display, printer, speaker, CD-writer, or another device that provides output from the computing environment (600).

The communication connection(s) (670) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment (600), computer-readable media include memory (620), storage (640), communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "select," "adjust," and "apply" to describe computer operations in a computing environment. These terms are high-level abstractions for operations performed by a computer, and should not be confused with acts performed by a human being. The actual computer operations corresponding to these terms vary depending on implementation.

II. Generalized Video Encoder and Decoder

Figure 8:
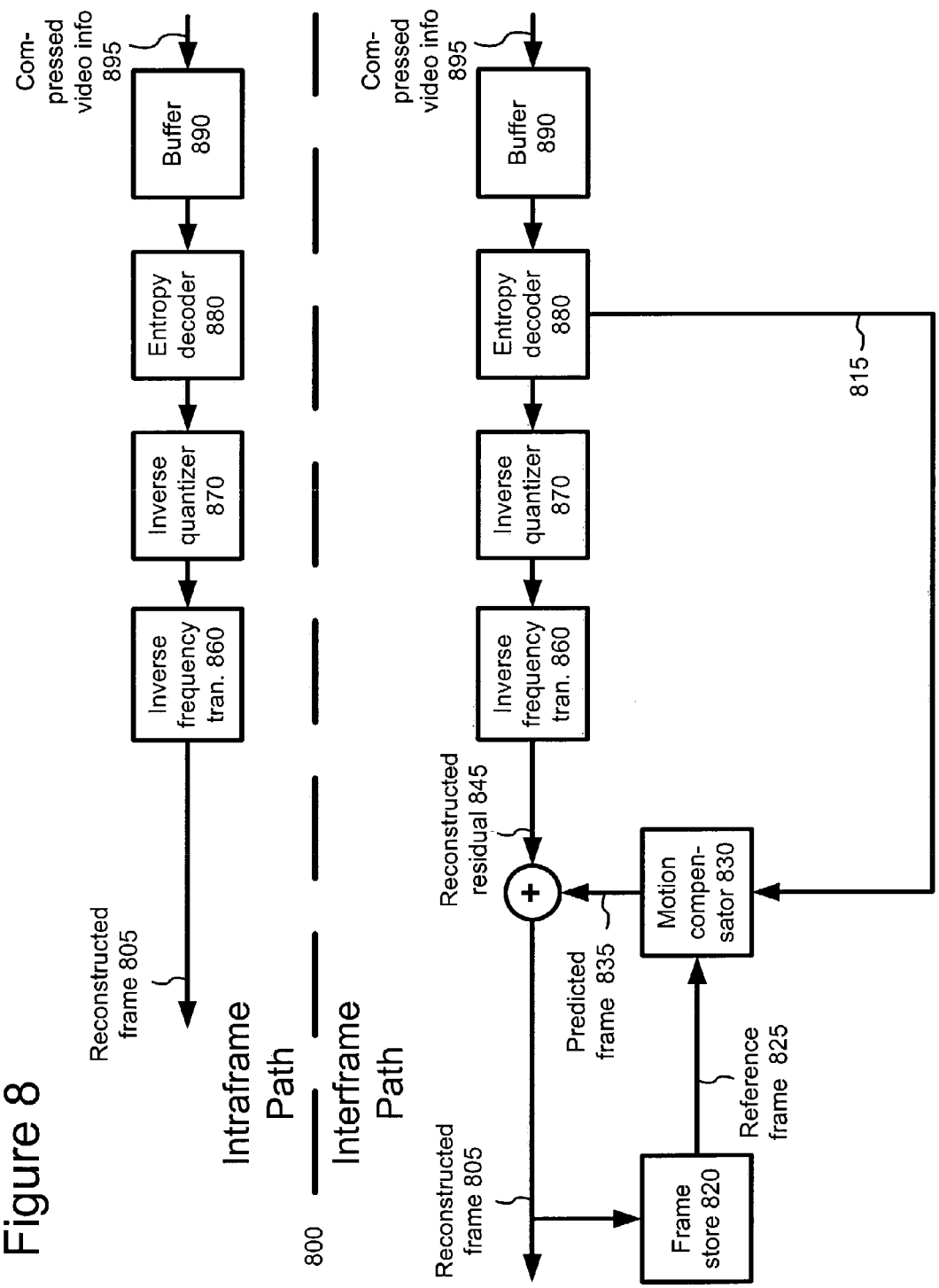
FIG. 8 is a block diagram of a generalized video decoder system used in 10 several described embodiments.

FIG. 7 is a block diagram of a generalized video encoder (700) and FIG. 8 is a block diagram of a generalized video decoder (800).

The relationships shown between modules within the encoder and decoder indicate the main flow of information in the encoder and decoder; other relationships are not shown for the sake of simplicity. In particular, FIGS. 7 and 8 usually do not show side information indicating the encoder settings, modes, tables, etc. used for a video sequence, frame, macroblock, block, etc. Such side information is sent in the output bitstream, typically after entropy encoding of the side information. The format of the output bitstream can be Windows Media Video version 8 format or another format.

The encoder (700) and decoder (800) are block-based and use a 4:2:0 macroblock format with each macroblock including 4 luminance 8×8 luminance blocks (at times treated as one 16×16 macroblock) and two 8×8 chrominance blocks. Alternatively, the encoder (700) and decoder (800) are object-based, use a different macroblock or block format, or perform operations on sets of pixels of different size or configuration than 8×8 blocks and 16×16 macroblocks.

Depending on implementation and the type of compression desired, modules of the encoder or decoder can be added, omitted, split into multiple modules, combined with other modules, and/or replaced with like modules. In alternative embodiments, encoder or decoders with different modules and/or other configurations of modules perform one or more of the described techniques.

A. Video Encoder

FIG. 7 is a block diagram of a general video encoder system (700). The encoder system (700) receives a sequence of video frames including a current frame (705), and produces compressed video information (795) as output. Particular embodiments of video encoders typically use a variation or supplemented version of the generalized encoder (700).

The encoder system (700) compresses predicted frames and key frames. For the sake of presentation, FIG. 7 shows a path for key frames through the encoder system (700) and a path for forward-predicted frames. Many of the components of the encoder system (700) are used for compressing both key frames and predicted frames. The exact operations performed by those components can vary depending on the type of information being compressed.

A predicted frame [also called p-frame, b-frame for bi-directional prediction, or inter-coded frame] is represented in terms of prediction (or difference) from one or more other frames. A prediction residual is the difference between what was predicted and the original frame. In contrast, a key frame [also called i-frame, intra-coded frame] is compressed without reference to other frames.

If the current frame (705) is a forward-predicted frame, a motion estimator (710) estimates motion of macroblocks or other sets of pixels of the current frame (705) with respect to a reference frame, which is the reconstructed previous frame (725) buffered in the frame store (720). In alternative embodiments, the reference frame is a later frame or the current frame is bi-directionally predicted. The motion estimator (710) can estimate motion by pixel, ½ pixel, ¼ pixel, or other increments, and can switch the resolution of the motion estimation on a frame-by-frame basis or other basis. The resolution of the motion estimation can be the same or different horizontally and vertically. The motion estimator (710) outputs as side information motion information (715) such as motion vectors. A motion compensator (730) applies the motion information (715) to the reconstructed previous frame (725) to form a motion-compensated current frame (735). The prediction is rarely perfect, however, and the difference between the motion-compensated current frame (735) and the original current frame (705) is the prediction residual (745). Alternatively, a motion estimator and motion compensator apply another type of motion estimation/compensation.

A frequency transformer (760) converts the spatial domain video information into frequency domain (i.e., spectral) data. For block-based video frames, the frequency transformer (760) applies a discrete cosine transform ["DCT"] or variant of DCT to blocks of the pixel data or prediction residual data, producing blocks of DCT coefficients. Alternatively, the frequency transformer (760) applies another conventional frequency transform such as a Fourier transform or uses wavelet or subband analysis. In embodiments in which the encoder uses spatial extrapolation (not shown in FIG. 7) to encode blocks of key frames, the frequency transformer (760) can apply a re-oriented frequency transform such as a skewed DCT to blocks of prediction residuals for the key frame. In other embodiments, the frequency transformer (760) applies an 8×8, 8×4, 4×8, or other size frequency transforms (e.g., DCT) to prediction residuals for predicted frames.

A quantizer (770) then quantizes the blocks of spectral data coefficients. The quantizer applies uniform, scalar quantization to the spectral data with a step-size that varies on a frame-by-frame basis or other basis. Alternatively, the quantizer applies another type of quantization to the spectral data coefficients, for example, a non-uniform, vector, or non-adaptive quantization, or directly quantizes spatial domain data in an encoder system that does not use frequency transformations. In addition to adaptive quantization, the encoder (700) can use frame dropping, adaptive filtering, or other techniques for rate control.

When a reconstructed current frame is needed for subsequent motion estimation/compensation, an inverse quantizer (776) performs inverse quantization on the quantized spectral data coefficients. An inverse frequency transformer (766) then performs the inverse of the operations of the frequency transformer (760), producing a reconstructed prediction residual (for a predicted frame) or a reconstructed key frame. If the current frame (705) was a key frame, the reconstructed key frame is taken as the reconstructed current frame (not shown). If the current frame (705) was a predicted frame, the reconstructed prediction residual is added to the motion-compensated current frame (735) to form the reconstructed current frame. The frame store (720) buffers the reconstructed current frame for use in predicting the next frame. In some embodiments, the encoder applies a deblocking filter to the reconstructed frame to adaptively smooth discontinuities in the blocks of the frame.

The entropy coder (780) compresses the output of the quantizer (770) as well as certain side information (e.g., motion information (715), spatial extrapolation modes, quantization step size). Typical entropy coding techniques include arithmetic coding, differential coding, Huffman coding, run length coding, LZ coding, dictionary coding, and combinations of the above. The entropy coder (780) typically uses different coding techniques for different kinds of information (e.g., DC coefficients, AC coefficients, different kinds of side information), and can choose from among multiple code tables within a particular coding technique.

The entropy coder (780) puts compressed video information (795) in the buffer (790). A buffer level indicator is fed back to bitrate adaptive modules.

The compressed video information (795) is depleted from the buffer (790) at a constant or relatively constant bitrate and stored for subsequent streaming at that bitrate. Therefore, the level of the buffer (790) is primarily a function of the entropy of the filtered, quantized video information, which affects the efficiency of the entropy coding. Alternatively, the encoder system (700) streams compressed video information immediately following compression, and the level of the buffer (790) also depends on the rate at which information is depleted from the buffer (790) for transmission.

Before or after the buffer (790), the compressed video information (795) can be channel coded for transmission over the network. The channel coding can apply error detection and correction data to the compressed video information (795).

B. Video Decoder

FIG. 8 is a block diagram of a general video decoder system (800). The decoder system (800) receives information (895) for a compressed sequence of video frames and produces output including a reconstructed frame (805). Particular embodiments of video decoders typically use a variation or supplemented version of the generalized decoder (800).

The decoder system (800) decompresses predicted frames and key frames. For the sake of presentation, FIG. 8 shows a path for key frames through the decoder system (800) and a path for forward-predicted frames. Many of the components of the decoder system (800) are used for compressing both key frames and predicted frames. The exact operations performed by those components can vary depending on the type of information being compressed.

A buffer (890) receives the information (895) for the compressed video sequence and makes the received information available to the entropy decoder (880). The buffer (890) typically receives the information at a rate that is fairly constant over time, and includes a jitter buffer to smooth short-term variations in bandwidth or transmission. The buffer (890) can include a playback buffer and other buffers as well. Alternatively, the buffer (890) receives information at a varying rate. Before or after the buffer (890), the compressed video information can be channel decoded and processed for error detection and correction.

The entropy decoder (880) entropy decodes entropy-coded quantized data as well as entropy-coded side information (e.g., motion information (815), spatial extrapolation modes, quantization step size), typically applying the inverse of the entropy encoding performed in the encoder. Entropy decoding techniques include arithmetic decoding, differential decoding, Huffman decoding, run length decoding, LZ decoding, dictionary decoding, and combinations of the above. The entropy decoder (880) frequently uses different decoding techniques for different kinds of information (e.g., DC coefficients, AC coefficients, different kinds of side information), and can choose from among multiple code tables within a particular decoding technique.

If the frame (805) to be reconstructed is a forward-predicted frame, a motion compensator (830) applies motion information (815) to a reference frame (825) to form a prediction (835) of the frame (805) being reconstructed. For example, the motion compensator (830) uses a macroblock motion vector to find a macroblock in the reference frame (825). A frame buffer (820) stores previous reconstructed frames for use as reference frames. The motion compensator (830) can compensate for motion at pixel, ½ pixel, ¼ pixel, or other increments, and can switch the resolution of the motion compensation on a frame-by-frame basis or other basis. The resolution of the motion compensation can be the same or different horizontally and vertically. Alternatively, a motion compensator applies another type of motion compensation. The prediction by the motion compensator is rarely perfect, so the decoder (800) also reconstructs prediction residuals.

When the decoder needs a reconstructed frame for subsequent motion compensation, the frame store (820) buffers the reconstructed frame for use in predicting the next frame. In some embodiments, the encoder applies a deblocking filter to the reconstructed frame to adaptively smooth discontinuities in the blocks of the frame.

An inverse quantizer (870) inverse quantizes entropy-decoded data. In general, the inverse quantizer applies uniform, scalar inverse quantization to the entropy-decoded data with a step-size that varies on a frame-by-frame basis or other basis. Alternatively, the inverse quantizer applies another type of inverse quantization to the data, for example, a non-uniform, vector, or non-adaptive quantization, or directly inverse quantizes spatial domain data in a decoder system that does not use inverse frequency transformations.

An inverse frequency transformer (860) converts the quantized, frequency domain data into spatial domain video information. For block-based video frames, the inverse frequency transformer (860) applies an inverse DCT ["IDCT"] or variant of IDCT to blocks of the DCT coefficients, producing pixel data or prediction residual data for key frames or predicted frames, respectively. Alternatively, the frequency transformer (860) applies another conventional inverse frequency transform such as a Fourier transform or uses wavelet or subband synthesis. In embodiments in which the decoder uses spatial extrapolation (not shown in FIG. 8) to decode blocks of key frames, the inverse frequency transformer (860) can apply a re-oriented inverse frequency transform such as a skewed IDCT to blocks of prediction residuals for the key frame.

In other embodiments, the inverse frequency transformer (860) applies an 8×8, 8×4, 4×8, or other size inverse frequency transforms (e.g., IDCT) to prediction residuals for predicted frames.

III. Intraframe Encoding and Decoding

In one or more embodiments, a video encoder exploits redundancies in typical still images in order to code the I-frame information using a smaller number of bits. For additional detail about intraframe encoding and decoding in some embodiments, see U.S. patent application Ser. No. 10/322,171, entitled "Spatial Extrapolation of Pixel Values in Intraframe Video Coding and Decoding," filed concurrently herewith.

IV. Interframe Encoding and Decoding

Inter-frame coding exploits temporal redundancy between frames to achieve compression. Temporal redundancy reduction uses previously coded frames as predictors when coding the current frame.

A. Motion Estimation

In one or more embodiments, a video encoder exploits temporal redundancies in typical video sequences in order to code the information using a smaller number of bits. The video encoder uses motion estimation/compensation of a macroblock or other set of pixels of a current frame with respect to a reference frame. A video decoder uses corresponding motion compensation. For additional detail about motion estimation and motion compensation in some embodiments, see U.S. patent application Ser. No. 10/322,351, entitled "Multi-Resolution Motion Estimation and Compensation," filed concurrently herewith.

B. Coding of Prediction Residuals

Motion estimation is rarely perfect, and the video encoder uses prediction residuals to represent the differences between the original video information and the video information predicted using motion estimation. In one or more embodiments, a video encoder exploits redundancies in prediction residuals in order to code the information using a smaller number of bits. For additional detail about coding of prediction residuals in some embodiments, see U.S. patent application Ser. No. 10/322,352, entitled "Sub-Block Transform Coding of Prediction Residuals," filed concurrently herewith.

C. Loop Filtering

Quantization and other lossy processing of prediction residuals can cause blocky artifacts (artifacts at block boundaries) in reference frames that are used for motion estimation of subsequent predicted frames. Post-processing by a decoder to remove blocky artifacts after reconstruction of a video sequence improves perceptual quality. Post-processing does not improve motion compensation using the reconstructed frames as reference frames, however, and does not improve compression efficiency. With or without post-processing, the same amount of bits is used for compression, but the post-processing improves perceived quality. Moreover, the filters used for deblocking in post-processing can introduce too much smoothing in reference frames used for motion estimation/compensation.

In one or more embodiments, a video encoder processes a reconstructed frame to reduce blocky artifacts prior to motion estimation using the reference frame. A video decoder processes the reconstructed frame to reduce blocky artifacts prior to motion compensation using the reference frame. With deblocking, a reference frame becomes a better reference candidate to encode the following frame. Thus, using the deblocking filter improves the quality of motion estimation/compensation, resulting in better prediction and lower bitrate for prediction residuals. The deblocking filter is especially helpful in low bitrate applications. Various features of the loop filtering can be used in combination or independently. These features include, but are not limited to:

1a) Using a deblocking filter in a motion estimation/compensation loop in a video encoder.

1b) Using a deblocking filter in a motion compensation loop in a video decoder.

2a) Adaptively filtering block boundaries of a reference frame in a loop in a video encoder or decoder. The adaptive filtering reduces the undesirable blurring of image properties coincident with block boundaries.

2b) Adaptively filtering block boundaries of a reference frame in a loop in a video encoder or decoder with reference to a threshold based at least in part upon a quantization level.

3) Using a short filter to smooth block boundaries in a reference frame in a loop in a video encoder or decoder. Compared to other filters, the short filter preserves more original information for use in motion estimation/compensation.

4a) Adaptively enabling or disabling loop filtering in a video encoder or decoder.

4b) Adaptively enabling or disabling loop filtering in a video encoder following a decision in a closed loop or open loop.

4c) Adaptively enabling or disabling loop filtering in a video encoder or decoder on a per-frame, per-sequence, or other basis.

4d) Enabling or disabling loop filtering in a video decoder according to flags received from a video encoder or contextual information.

In some embodiments, following the reconstruction of a frame in a video encoder or decoder, the encoder/decoder applies a deblocking filter to 8×8 blocks in the reconstructed frame. The deblocking filter removes boundary discontinuities between blocks in the reconstructed frame, which improves the quality of subsequent motion estimation using the reconstructed frame as a reference frame. The encoder/decoder performs deblocking after reconstructing the frame in a motion compensation loop in order for motion compensation to work as expected. This contrasts with typical deblocking processes, which operate on the whole image outside of the motion compensation loop. The deblocking filter itself, however, can be the same or different than a filter used in post-processing. For example, a decoder can apply an additional post-processing deblocking filter to further smooth a reconstructed frame for playback after applying the deblocking filter for the frame as a reference frame for motion compensation. In alternative embodiments, the deblocking filter is applied to sets of pixels other than 8×8 blocks.

The encoder/decoder applies the deblocking filter across boundary rows and/or columns in the reference frame. In some embodiments, the encoder/decoder adaptively filters block boundaries. The adaptive filtering reduces the unintended blurring of image properties that coincide with block boundaries. The adaptive filtering can depend on difference thresholds across boundaries, and can factor in a quantization level for the reference frame. In alternative embodiments, the encoder/decoder always applies the deblocking filter.

The encoder/decoder applies one or more different filters for deblocking. In some embodiments, the encoder/decoder applies a short filter. Compared to other filters, the short filter affects fewer pixels, preserving more original information for motion estimation. Other embodiments do not use the short filter.

In some embodiments, the encoder/decoder enables or disables loop filtering on a per-sequence or other basis. In other embodiments, the encoder/decoder always applies the deblocking filter to reference frames.

1. Deblocking Filter for Reference Frames

Figure 9:
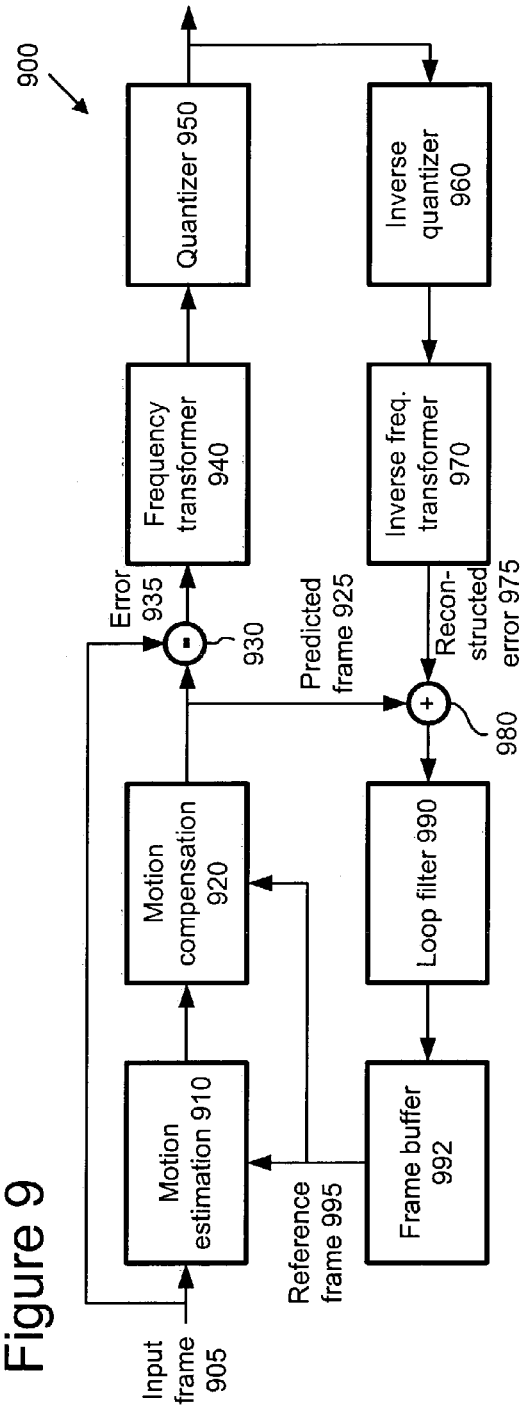
FIG. 9 is a block diagram showing a motion estimation/compensation loop with deblocking of a reference frame in a video encoder.
Figure 10:
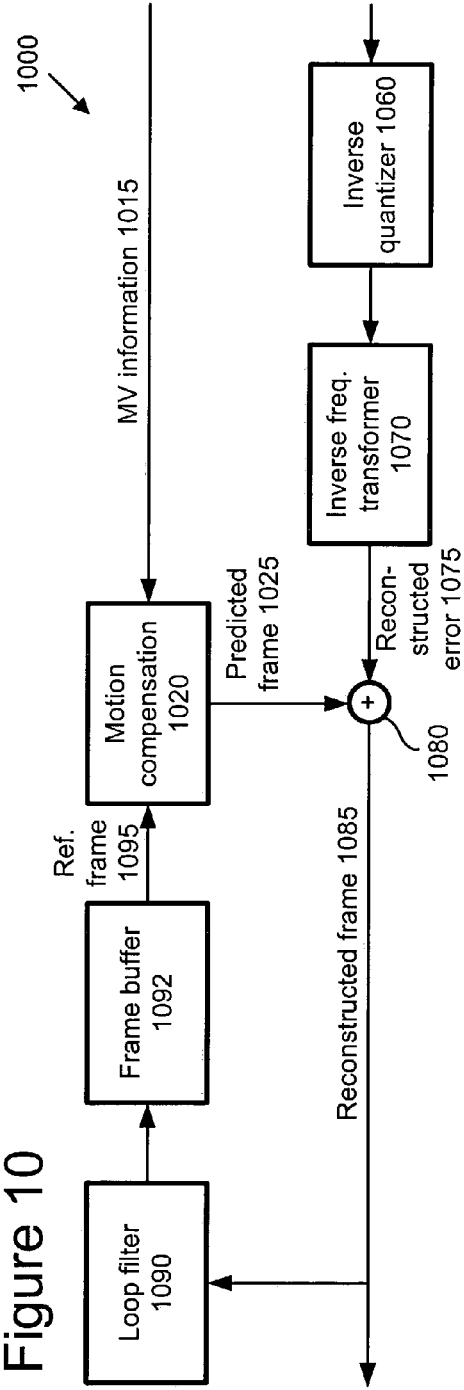
FIG. 10 is a block diagram showing a motion compensation loop with deblocking of a reference frame in a video decoder.

The deblocking filter smoothes boundary discontinuities between blocks in reconstructed frames in a video encoder or decoder. FIG. 9 shows a motion estimation/compensation loop in a video encoder that includes a deblocking filter. FIG. 10 shows a motion compensation loop in a video decoder that includes a deblocking filter.

With reference to FIG. 9, a motion estimation/compensation loop (900) includes motion estimation (910) and motion compensation (920) of an input frame (905). The motion estimation (910) finds motion information for the input frame (905) with respect to a reference frame (995), which is typically a previously reconstructed intra- or inter-coded frame. In alternative embodiments, the loop filter is applied to backward-predicted or bi-directionally-predicted frames. The motion estimation (910) produces motion information such as a set of motion vectors for the frame. The motion compensation (920) applies the motion information to the reference frame (995) to produce a predicted frame (925).

The prediction is rarely perfect, so the encoder computes (930) the error/prediction residual (935) as the difference between the original input frame (905) and the predicted frame (925). The frequency transformer (940) frequency transforms the prediction residual (935), and the quantizer (950) quantizes the frequency coefficients for the prediction residual (935) before passing them to downstream components of the encoder.

In the motion estimation/compensation loop, the inverse quantizer (960) inverse quantizes the frequency coefficients of the prediction residual (935), and the inverse frequency transformer (970) changes the prediction residual (935) back to the spatial domain, producing a reconstructed error (975) for the frame (905).

The encoder then combines (980) the reconstructed error (975) with the predicted frame (925) to produce a reconstructed frame. The encoder applies the deblocking loop filter (990) to the reconstructed frame and stores the reconstructed frame in a frame buffer (992) for use as a reference frame (995) for the next input frame. Alternatively, the loop filter (990) follows the frame buffer (992).

In alternative embodiments, the arrangement or constituents of the motion estimation/compensation loop changes, but the encoder still applies the deblocking loop filter to reference frames.

With reference to FIG. 10, a motion compensation loop (1000) includes motion compensation (1020) to produce a reconstructed frame (1085). The decoder receives motion information (1015) from the encoder. The motion compensation (1020) applies the motion information (1015) to a reference frame (1095) to produce a predicted frame (1025).

In a separate path, the inverse quantizer (1060) inverse quantizes the frequency coefficients of a prediction residual, and the inverse frequency transformer (1070) changes the prediction residual back to the spatial domain, producing a reconstructed error (1075) for the frame (1085).

The decoder then combines (1080) the reconstructed error (1075) with the predicted frame (1025) to produce the reconstructed frame (1085), which is output from the decoder. The decoder also applies a deblocking loop filter (1090) to the reconstructed frame (1085) and stores the reconstructed frame in a frame buffer (1092) for use as the reference frame (1095) for the next input frame. Alternatively, the loop filter (1090) follows the frame buffer (1092).

In alternative embodiments, the arrangement or constituents of the motion compensation loop changes, but the decoder still applies the deblocking loop filter to reference frames.

Figure 11:
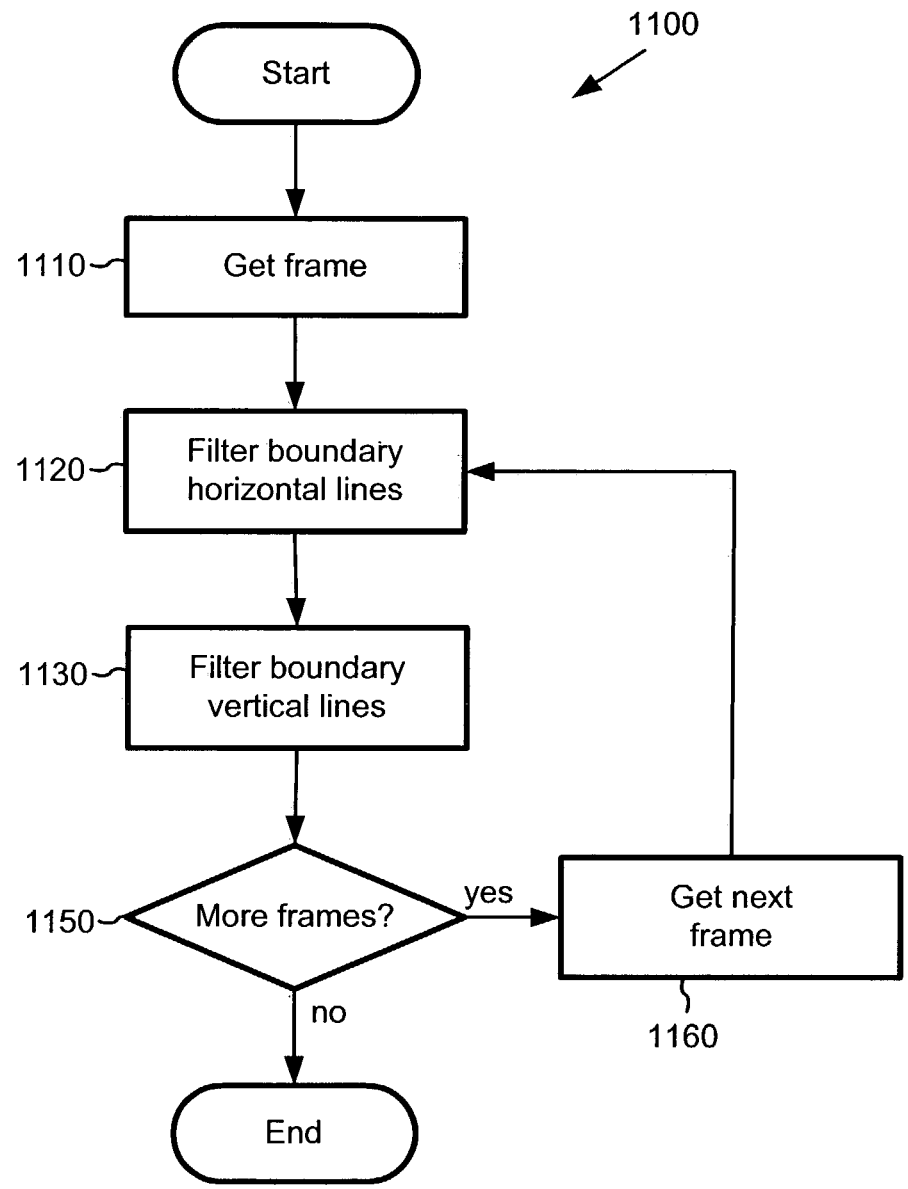
FIG. 11 is a flowchart showing a technique for loop filtering of reference frames.

FIG. 11 shows a technique for applying a deblocking filter to reference frames in a video encoder or decoder. For the sake of simplicity, FIG. 11 does not show the various ways in which the technique (1100) can be used in conjunction with other techniques.

With reference to FIG. 11, a video encoder/decoder gets (1110) a reconstructed frame. For example, the reconstructed frame is a combination of a reconstructed prediction residual and a predicted frame.

The video encoder/decoder filters (1120) block boundary horizontal lines in the reconstructed frame, and then filters (1130) block boundary vertical lines in the reconstructed frame. The filtering smoothes out the discontinuities between the blocks of the reconstructed frame. Therefore, the filtering process operates on the pixels that border neighboring blocks.

Figure 12:
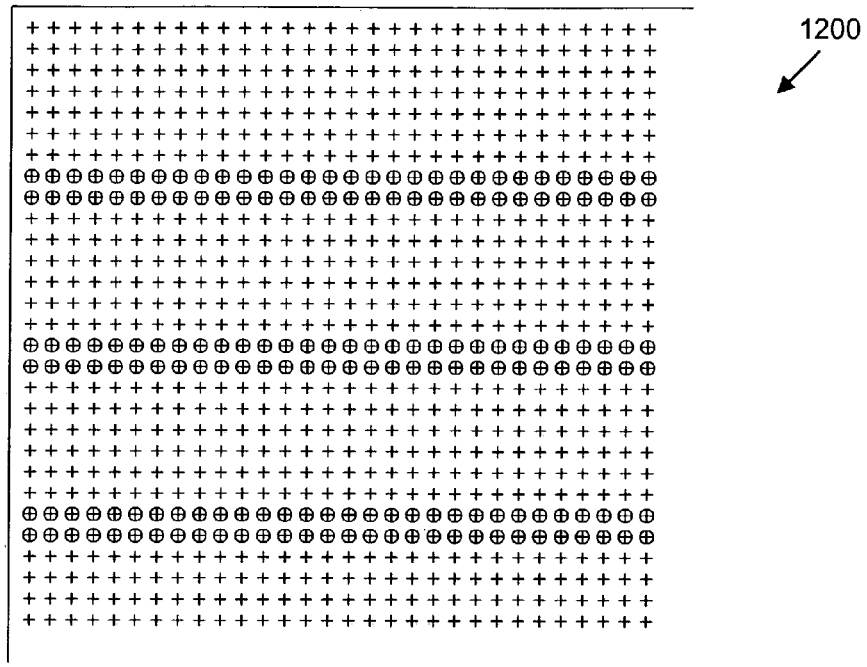
FIG. 12 is a chart showing boundary pixel locations in rows of a reference frame that are filtered with a deblocking filter.
Figure 13:
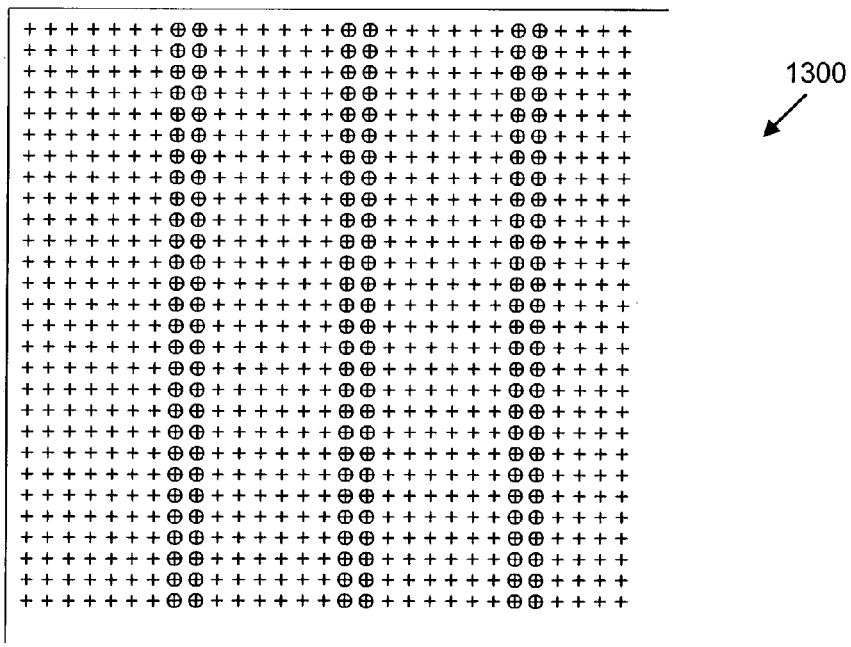
FIG. 13 is a chart showing boundary pixel locations columns of a reference frame that are filtered with a deblocking filter.

FIG. 12 shows boundary pixel locations in rows of pixels that are filtered in one implementation, and FIG. 13 shows boundary pixels locations in columns of pixels that are filtered in the implementation. FIGS. 12 and FIG. 13 show the upper left corner of a component (e.g., luminance or chrominance) plane. The frame boundaries to the top and left are shown as solid lines. The crosses represent pixels, and circled crosses represent pixels that are filtered. As FIGS. 12 and FIG. 13 show, the pixels of the top row and left column are not filtered. The bottom horizontal line and last vertical line are also not filtered. The following lines are filtered:

horizontal lines (7,8), (15,16) ... ((N−1)*8−1, (N−1)*8)     (1), vertical lines (7,8), (15,16) ... ((M−1)*8−1, (M−1)*8)     (2), where N=the number of 8×8 blocks in the plane horizontally (N*8=horizontal frame size), M=the number of 8×8 blocks in the frame vertically (M*8=vertical frame size), and line numbering in each direction starts with 0.

All the horizontal lines in the frame are filtered first followed by the vertical lines. Thus, the filtering of vertical lines potentially considers pixels previously filtered in horizontal lines. Alternatively, the order of the horizontal and vertical filtering is reversed. In alternative embodiments, other pixel locations in a reference frame are filtered.

Following the filtering, the encoder/decoder determines (1150) whether there are any more frames. If not, the technique ends. If so, the encoder/decoder gets (1160) the next frame and filters it.

In some embodiments, the video encoder enables or disables loop filtering of reference frames based upon encoder settings, context information, or other criteria. The encoder can embed a switch at a frame, sequence, or other level to enable/disable deblocking with a loop filter.

2. Short Filter

Figure 14:
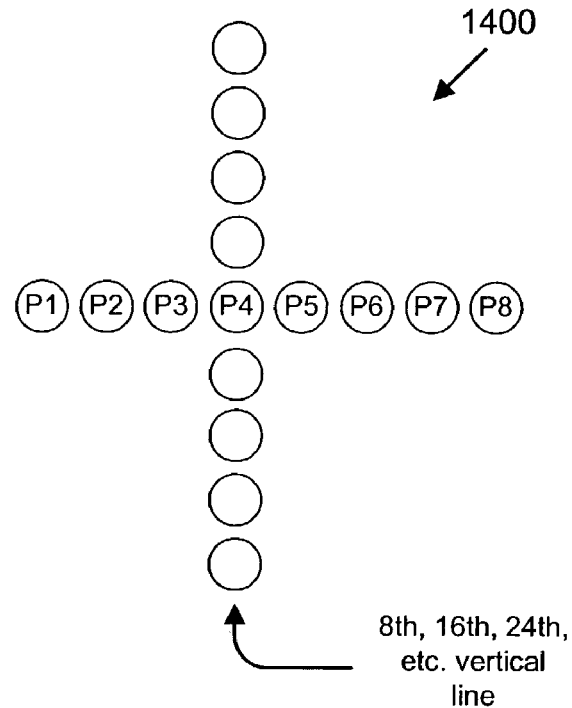
FIG. 14 is a chart showing pixel locations for filtering a vertical line.
Figure 15:
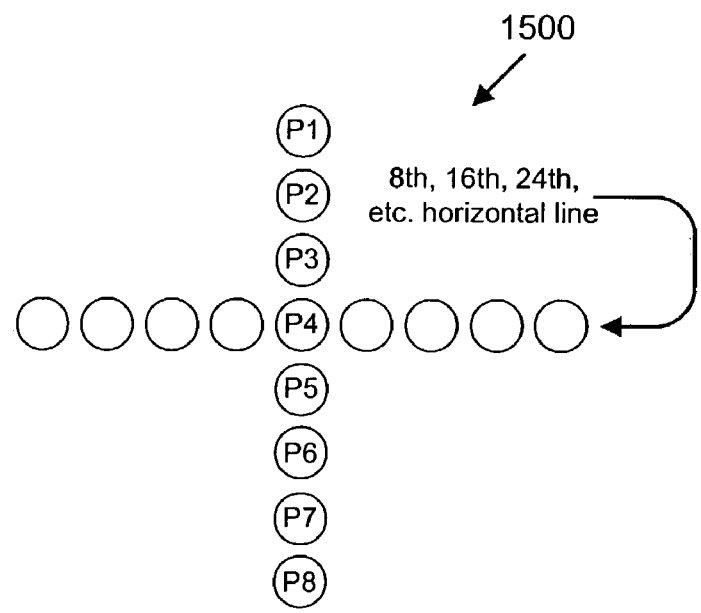
FIG. 15 is a chart showing pixel locations for filtering a horizontal line.

FIG. 14 shows pixel locations for filtering a vertical line in one implementation. The pixel location P4 corresponds to a pixel of the eighth vertical line in the frame, and the pixel location P5 corresponds to a pixel of the ninth vertical line in the frame, etc. The labeled pixels P1 through P8 indicate pixel values that are involved in the filtering operation. Within this group, pixels P4 and P5 are modified by the filtering. Pixels P4 and P5 in FIG. 14 correspond to pixels at locations indicated with circled crosses in FIG. 13. FIG. 15 shows pixel locations for filtering a horizontal line in the implementation, and is the transpose of FIG. 14. The filter definitions for the locations shown in FIGS. 14 and 15 in this implementation are shown in FIG. 16.

In some embodiments, the encoder and decoder use a short filter. In particular, in one implementation the encoder and decoder use a modified form of the MPEG 4 post-processing deblocking filter. For a complete definition of the MPEG 4 post-processing deblocking filter, see the MPEG 4 standard. With the modified filter, only one pixel on each side of the block boundary is smoothed if the neighboring pixel values meet a smoothness test, which is defined below for the implementation. This reduces the number of values that are modified in a reference frame, and improves the quality of prediction using estimation. The encoder/decoder adjusts both boundary pixels with one filtering operation. In other implementations, the encoder/decoder still modifies only one pixel on each side of a block boundary, but uses another filter definition, other smoothness test, or two filtering operations.

Alternatively, the encoder and decoder use filters that consider more or fewer pixel locations, select between different filters, modify more or fewer pixel locations, and/or use different filtering horizontally and vertically.

3. Adaptive Deblocking Filter

Figure 17:
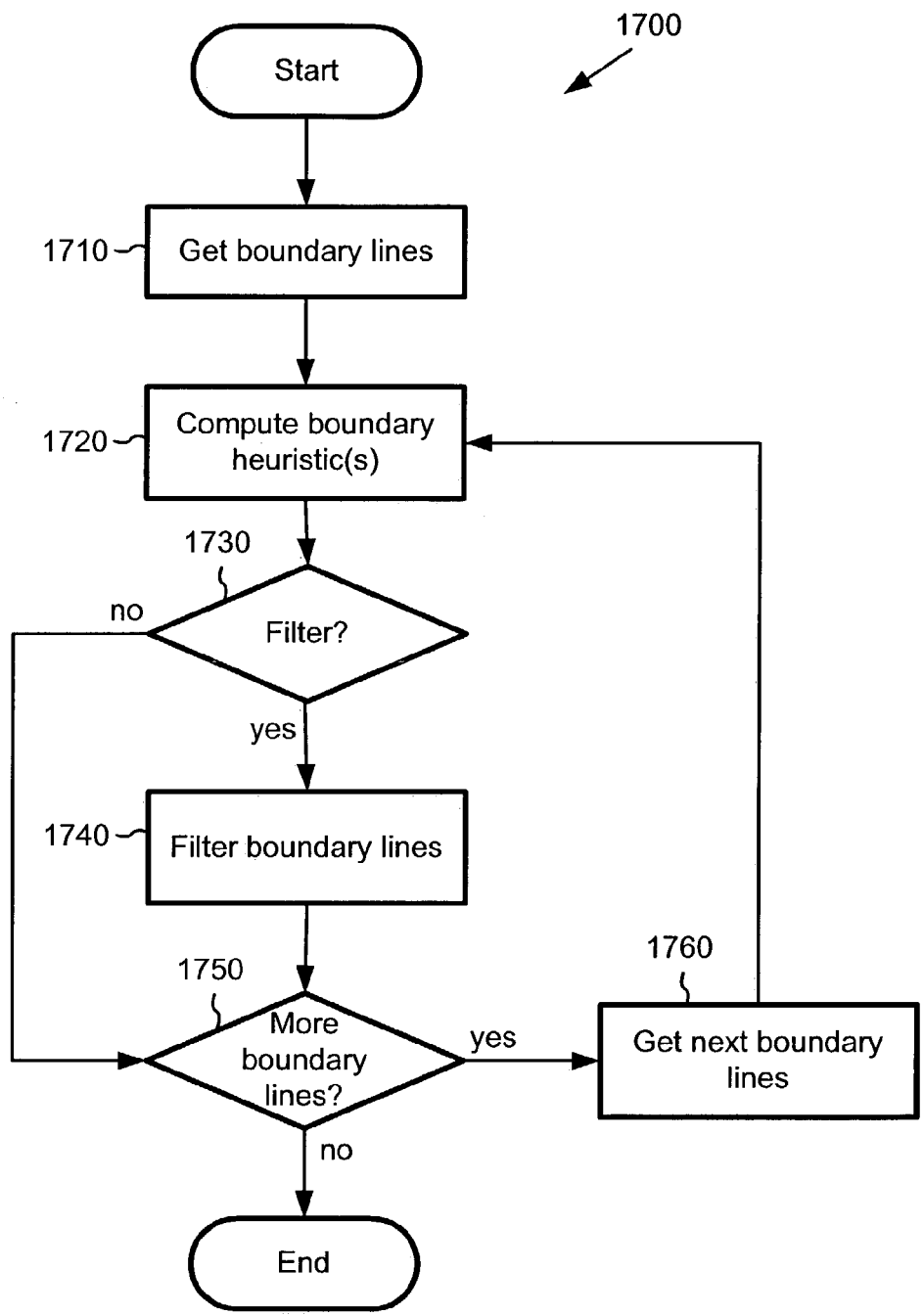
FIG. 17 is a flowchart showing a technique for adaptively filtering boundary pixels of a reference frame in a loop.

FIG. 17 shows a technique for selectively filtering boundary pixels for blocks in a reference frame in a video encoder or decoder. The encoder/decoder typically applies the technique (1700) for horizontal filtering then applies it again for vertical filtering. For the sake of simplicity, FIG. 17 does not show the various ways in which the technique (1700) can be used in conjunction with other techniques.

FIG. 16 shows pseudocode (1600) for a filtering operation performed on pixels in horizontal or vertical lines in one implementation. The values P1, P2 . . . P8 in the pseudocode (1600) correspond to the labeled pixels in FIGS. 14 and 15.

With reference to FIGS. 16 and 17, the encoder/decoder gets (1710) boundary lines between blocks for a reference frame. For example, the encoder/decoder gets the eighth and ninth, sixteenth and seventeenth, etc. lines horizontally or vertically in a reference frame with 8×8 blocks.

The encoder/decoder then computes (1720) one or more boundary heuristics for the boundary lines. For example, the encoder computes a cross-boundary discontinuity heuristic a0, a first side (i.e., top or left) discontinuity heuristic a1, a second side (i.e., right or bottom) discontinuity heuristic a2, and an intermediate heuristic a3 as shown in FIG. 16 in one implementation. The value of a0 depends on the values of P3 through P6, the value of a1 on P1 through P4, and the value of a2 on P5 through P8. In other implementations, the encoder/decoder computes more or fewer boundary heuristics and/or uses different formulas for the boundary heuristics. For example, the encoder/decoder uses simpler heuristics to reduce computational complexity (especially in the decoder) and/or computes heuristics for some subset of boundary lines instead of every group of boundary lines.

The encoder/decoder then determines (1730) whether the boundary lines should be filtered. The encoder typically considers the one or more boundary heuristics in this determination. In some implementations, the encoder compares one or more of the boundary heuristics to a quantization level. By performing this comparison (e.g., magnitude of a0 versus frame quantization step size PQUANT in FIG. 16), the encoder/decoder can avoid some filtering operations for discontinuities caused by image properties, not by quantization. For example, if a0 is greater than PQUANT, there is a greater chance that the discontinuity is due to a property of the image and should not be smoothed. The encoder/decoder can also compare the boundary heuristics to each other. For example, FIG. 16 shows a comparison of the magnitude of a0 to the minimum magnitude of a1 and a2. By performing this comparison, the encoder/decoder avoids some filtering operations for cross-boundary discontinuities on the order of image property discontinuities already in one block or the other around the boundary. In other implementations, the encoder/decoder uses different conditional logic to decide when to apply a deblocking filter.

If the encoder/decoder determines the boundary lines should be filtered, the encoder/decoder filters (1740) the boundary lines. For example, the encoder/decoder adjusts the pixels P4 and P5 by some value. In FIG. 16, the encoder/decoder computes the average difference clip of the pixels P4 and P5. The encoder/decoder also computes another measure d that depends on the boundary heuristics a0 and a3, with a magnitude no greater than clip. If clip is non-zero, the pixels P4 and P5 are adjusted by the value d. In other implementations, the encoder/decoder modifies more or fewer pixels of the boundary lines, uses different filter definitions, uses a different adjustment factor (e.g., (P4+P5)/x), and/or uses different filters for different operations. If the encoder/decoder determines the boundary lines should not be filtered, the encoder/decoder skips the filtering (1740) step.

The encoder/decoder determines (1750) whether more boundary lines in the frame should be filtered. If not, the technique ends. If so, the encoder/decoder gets (1760) the next boundary lines to be filtered in the frame.

Having described and illustrated the principles of our invention with reference to various embodiments, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

In view of the many possible embodiments to which the principles of our invention may be applied, we claim as our invention all such embodiments as may come within the scope and spirit of the following claims and equivalents thereto.

We claim:

1. A computer-implemented method of motion compensation, the method comprising:
   in a loop that includes motion compensation,
      adaptively filtering one or more boundaries between sets of pixels in a reference frame to reduce boundary discontinuities, wherein application of the filtering across a given boundary of the one or more boundaries depends at least in part upon plural discontinuity measures, the plural discontinuity measures including:
         a cross boundary discontinuity measure that quantifies pixel value discontinuity across the given boundary;
         a first side discontinuity measure that quantifies pixel value discontinuity on a first side of the given boundary, wherein the first side discontinuity measure is computed using plural pixel values on the first side of the given boundary;
         a second side discontinuity measure that quantifies pixel value discontinuity on a second side of the given boundary, wherein the second side discontinuity measure is computed using plural pixel values on the second side of the given boundary, and wherein the first side is different than the second side; and
      performing the motion compensation for a predicted frame relative to the reference frame.

2. The method of claim 1 wherein the sets are blocks.

3. The method of claim 1 wherein for each of plural lines of pixels across the given boundary the filtering adjusts no more than one pixel value on each of the first and second sides.

4. The method of claim 1 wherein the application of the filtering further depends at least in a part upon a quantization level.

5. The method of claim 1 further comprising selectively disabling the filtering.

6. A computer-readable medium storing computer-executable instructions for causing a computer system to perform the method of claim 1 in a video encoder.

7. A computer-readable medium storing computer-executable instructions for causing a computer system to perform the method of claim 1 in a video decoder.

8. A computer-implemented method of motion compensation, the method comprising:
in a loop that includes motion compensation,
applying a short deblocking filter across one or more boundaries between sets of pixels in a reference frame to reduce boundary discontinuities, wherein in each of plural lines of pixels across a given boundary of the one or more boundaries the short deblocking filter modifies no more than one pixel value on each side of the given boundary, and wherein each modified pixel value is based at least in part on plural pixel values on the same side of the given boundary as the modified pixel value; and
performing the motion compensation for a predicted frame relative to the reference frame.

9. The method of claim 8 wherein the applying depends at least in part upon one or more boundary heuristics, the one or more boundary heuristics including a cross boundary discontinuity measure and plural side discontinuity measures, each of the plural side discontinuity measures being computed using plural pixel values on a given different side of the given boundary.

10. The method of claim 8 wherein the applying depends at least in part upon a quantization level.

11. The method of claim 8 wherein the sets are blocks.

12. The method of claim 8 further comprising selectively enabling the applying.

13. A computer-readable medium storing computer-executable instructions for causing a computer system to perform the method of claim 8 in a video encoder.

14. A computer-readable medium storing computer-executable instructions for causing a computer system to perform the method of claim 8 in a video decoder.

15. A computer-readable medium storing computer-executable instructions for causing a computer system programmed thereby to perform a method of motion estimation and compensation during video encoding, the method comprising:
evaluating first motion compensation for one or more predicted frames relative to one or more reference frames;
filtering one or more boundaries between sets of pixels in the one or more reference frames to reduce boundary discontinuities;
evaluating second motion compensation for the one or more predicted frame relative to the one or more reference frames with the filtered one or more boundaries;
selectively using either the first motion compensation or the second motion compensation based at least in part upon a comparison of first results of the first motion compensation with second results of the second motion compensation; and
signaling whether or not to perform corresponding filtering in the one or more reference frames during video decoding.

16. The computer-readable medium of claim 15 wherein the computer system performs the evaluating acts in an open loop.

17. The computer-readable medium of claim 15 wherein the computer system performs the evaluating acts in a closed loop.

18. The computer-readable medium of claim 15 wherein the computer system performs the signaling at sequence level.

19. The computer-readable medium of claim 15 wherein the computer system performs the signaling at frame level.

20. The method of claim 1 wherein the one or more boundaries are in a chrominance plane of the reference frame.

21. The method of claim 1 wherein the one or more boundaries are in a luminance plane of the reference frame.

22. The method of claim 1 wherein a single line of pixel values across the given boundary includes the plural pixel values on the first side and the plural pixel values on the second side.

23. The method of claim 8 wherein the one or more boundaries are in a chrominance plane of the reference frame.

24. The method of claim 8 wherein the one or more boundaries are in a luminance plane of the reference frame.

25. The computer-readable medium of claim 15 wherein the filtering adapts depending at least in part upon one or more boundary heuristics that include a cross boundary discontinuity measure and plural side discontinuity measures, each of the plural side discontinuity measures being computed using plural pixel values on a given different side of a given boundary of the one or more boundaries.

* * * * *